(12) United States Patent
Das et al.

(10) Patent No.: US 9,361,080 B2
(45) Date of Patent: *Jun. 7, 2016

(54) MULTI TENANT ACCESS TO APPLICATIONS

(71) Applicant: Microsoft Technology Licensing, LLC, Redmond, WA (US)

(72) Inventors: Manuvir Das, Hyderabad (IN); Sudarshan Yadav, Hyderabad (IN); Arvind Kandhare, Hyderabad (IN); Sanjay Malpani, Hyderabad (IN); Ravi K. Balachandran, Hyderabad (IN); Adam Herscher, Seattle, WA (US); Nelamangal K. Srinivas, Sammamish, WA (US); Rochak Mittal, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

This patent is subject to a terminal disclaimer.

(21) Appl. No.: 14/083,143

(22) Filed: Nov. 18, 2013

(65) Prior Publication Data

US 2014/0082059 A1    Mar. 20, 2014

Related U.S. Application Data

(63) Continuation of application No. 13/232,863, filed on Sep. 14, 2011, now Pat. No. 8,589,481.

(51) Int. Cl.
*G06F 15/16* (2006.01)
*G06F 9/445* (2006.01)
(Continued)

(52) U.S. Cl.
CPC ............... *G06F 8/60* (2013.01); *G06F 9/4445* (2013.01); *G06F 9/4843* (2013.01); *G06F 15/16* (2013.01); *G06F 21/00* (2013.01); *H04L 29/08072* (2013.01)

(58) Field of Classification Search
USPC .................. 709/203, 223–229, 250, 217–219
See application file for complete search history.

(56) References Cited

U.S. PATENT DOCUMENTS

| 6,023,721 A | 2/2000 | Cummings |
| 6,684,259 B1 * | 1/2004 | Discavage ........... G06F 9/45537 709/201 |

(Continued)

FOREIGN PATENT DOCUMENTS

| CN | 101014945 A | 8/2007 |
| CN | 101354677 A | 1/2009 |

(Continued)

OTHER PUBLICATIONS

"European Search Report Received for European Patent Application 12832167.6", Mailed Date: Jun. 12, 2015, 8 Pages.

(Continued)

*Primary Examiner* — Zarni Maung
(74) *Attorney, Agent, or Firm* — Henry Gabryjelski; Kate Drakos; Micky Minhas

(57) ABSTRACT

A mechanism is provided for presenting a software application to a plurality of users in a cloud computing environment. For example, an application that was designed for use by a single user is provided in a cloud based platform without re-architecting the application. Using a web-based interface, multiple cloud users may launch and execute the application. The various instances of the application are provided to the cloud users as if the application were designed as a multi-user application.

20 Claims, 18 Drawing Sheets

(51) Int. Cl.
*H04L 29/08* (2006.01)
*G06F 9/44* (2006.01)
*G06F 9/48* (2006.01)
*G06F 21/00* (2013.01)
*G06F 12/00* (2006.01)

(56) References Cited

U.S. PATENT DOCUMENTS

| | | | |
|---|---|---|---|
| 6,941,344 | B2 | 9/2005 | Prell et al. |
| 7,680,848 | B2 | 3/2010 | Janedittakarn et al. |
| 8,589,481 | B2 * | 11/2013 | Das ................. G06F 15/16 709/203 |
| 8,635,152 | B2 * | 1/2014 | Das ................. H04L 67/02 705/39 |
| 2005/0147033 | A1 | 7/2005 | Chin et al. |
| 2007/0260702 | A1 | 11/2007 | Richardson et al. |
| 2008/0034408 | A1 | 2/2008 | Duggal |
| 2008/0256607 | A1 | 10/2008 | Janedittakarn et al. |
| 2009/0049056 | A1 | 2/2009 | Shutt et al. |
| 2009/0113031 | A1 | 4/2009 | Ruan et al. |
| 2009/0187834 | A1 * | 7/2009 | Rapo ................. A63F 13/10 715/758 |
| 2010/0125612 | A1 | 5/2010 | Amradkar et al. |
| 2010/0146127 | A1 | 6/2010 | Schmieder et al. |
| 2010/0318992 | A1 | 12/2010 | Kushwaha et al. |
| 2010/0325278 | A1 | 12/2010 | Heim et al. |
| 2011/0087973 | A1 | 4/2011 | Martin et al. |
| 2011/0092279 | A1 | 4/2011 | Pilip |
| 2011/0153853 | A1 | 6/2011 | London et al. |
| 2011/0184993 | A1 | 7/2011 | Chawla et al. |
| 2012/0059918 | A1 | 3/2012 | Gadde et al. |
| 2012/0220875 | A1 | 8/2012 | Suri |
| 2013/0066770 | A1 | 3/2013 | Das et al. |

FOREIGN PATENT DOCUMENTS

| | | |
|---|---|---|
| CN | 101493724 A | 7/2009 |
| CN | 101939729 A | 1/2011 |
| CN | 102150105 A | 8/2011 |
| CN | 102160036 A | 8/2011 |

OTHER PUBLICATIONS

International application No. PCT/US2012/054539, International Search Report and Written Opinion, Feb. 27, 2013, 8 pages.
"Converting your Web Application into a Multi-Tenant SaaS Solution", Corent Technology, Copyright 2011, 20 pages.
Bezemer et al., "Challenges of Reengineering into Multi-Tenant SaaS Applications", Software Engineering Research Group(SERG), Sep. 20-21, 2010, 15 pages.
Hazrati, "Making Your Existing Applications Multi-Tenant in the Cloud", http://thoughts.inphina.com/2010/08/23/making-your-existing-applications-multi-tenant-in-the-cloud/, accessed May 12, 2011, 6 pages.

* cited by examiner

MULTI TENANT ACCESS TO APPLICATIONS

CROSS REFERENCE TO RELATED APPLICATIONS

This application is a continuation of U.S. patent application Ser. No. 13/232,863, filed on Sep. 14, 2011, now U.S. Pat. No. 8,589,481, the entire contents of which are incorporated herein by reference.

BACKGROUND

An increasingly popular form of networking may generally be referred to as remote presentation systems, which can use protocols such as Remote Desktop Protocol (RDP) and Independent Computing Architecture (ICA) to share a desktop and other applications executing on a server with a remote client. Cloud computing refers to a computing environment for enabling on-demand network access to a shared pool of computing resources. Many cloud computing services involve virtualized resources such as those described above and may take the form of web-based tools or applications that users can access and use through a web browser as if they were programs installed locally on their own computers.

Many applications are designed for use by a single user. For example, AutoCAD was designed as a single tenant application and intended to be used by a single user and not multiple users simultaneously. In contrast, a web based multi-tenant application such as Bing is intended to be accessed simultaneously by millions of users.

SUMMARY

In a cloud computing system, it is often desirable to provide access to software applications that were not designed to be executed in such an environment. Disclosed are methods and systems for presenting a software application to a plurality of users in a cloud computing environment. For example, an application that was designed for use by a single user is provided in a cloud based platform without re-architecting the application. Using a web-based interface, multiple cloud users may launch and execute the application. The various instances of the application are presented to the cloud users as if the application were designed as a multi-user application.

BRIEF DESCRIPTION OF THE DRAWINGS

The systems, methods, and computer readable media for deploying a software application to multiple users in a virtualized computing environment in accordance with this specification are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1:
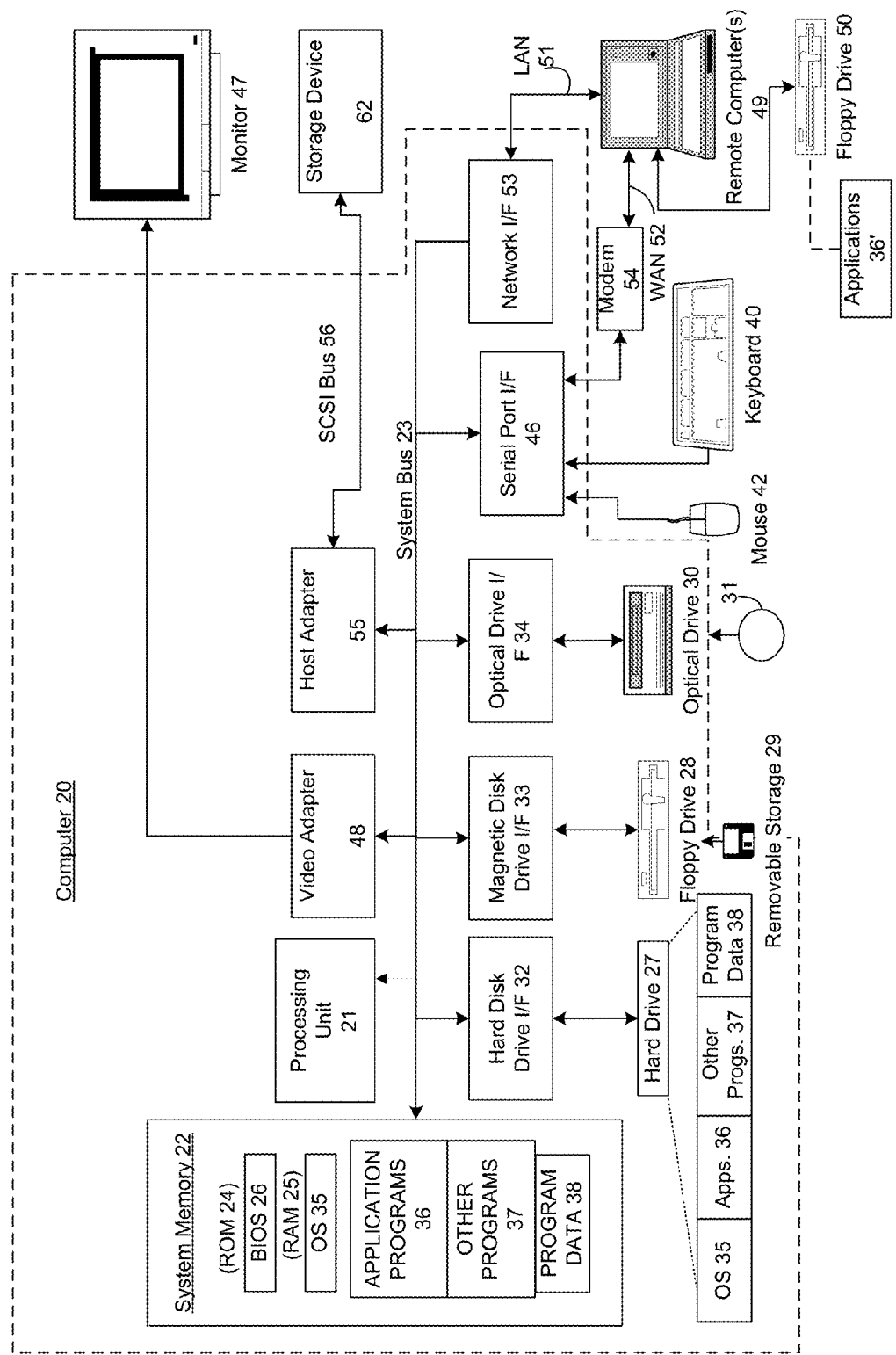
FIG. 1 depicts an example computing environment wherein aspects of the present disclosure can be implemented.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client Embodiments may execute on one or more computers. FIG. 1 and the following discussion are intended to provide a brief general description of a suitable computing environment in which the disclosure may be implemented. One skilled in the art can appreciate that computer systems 200, 300 can have some or all of the components described with respect to computer 100 of FIG. 1.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non-volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Figure 2:
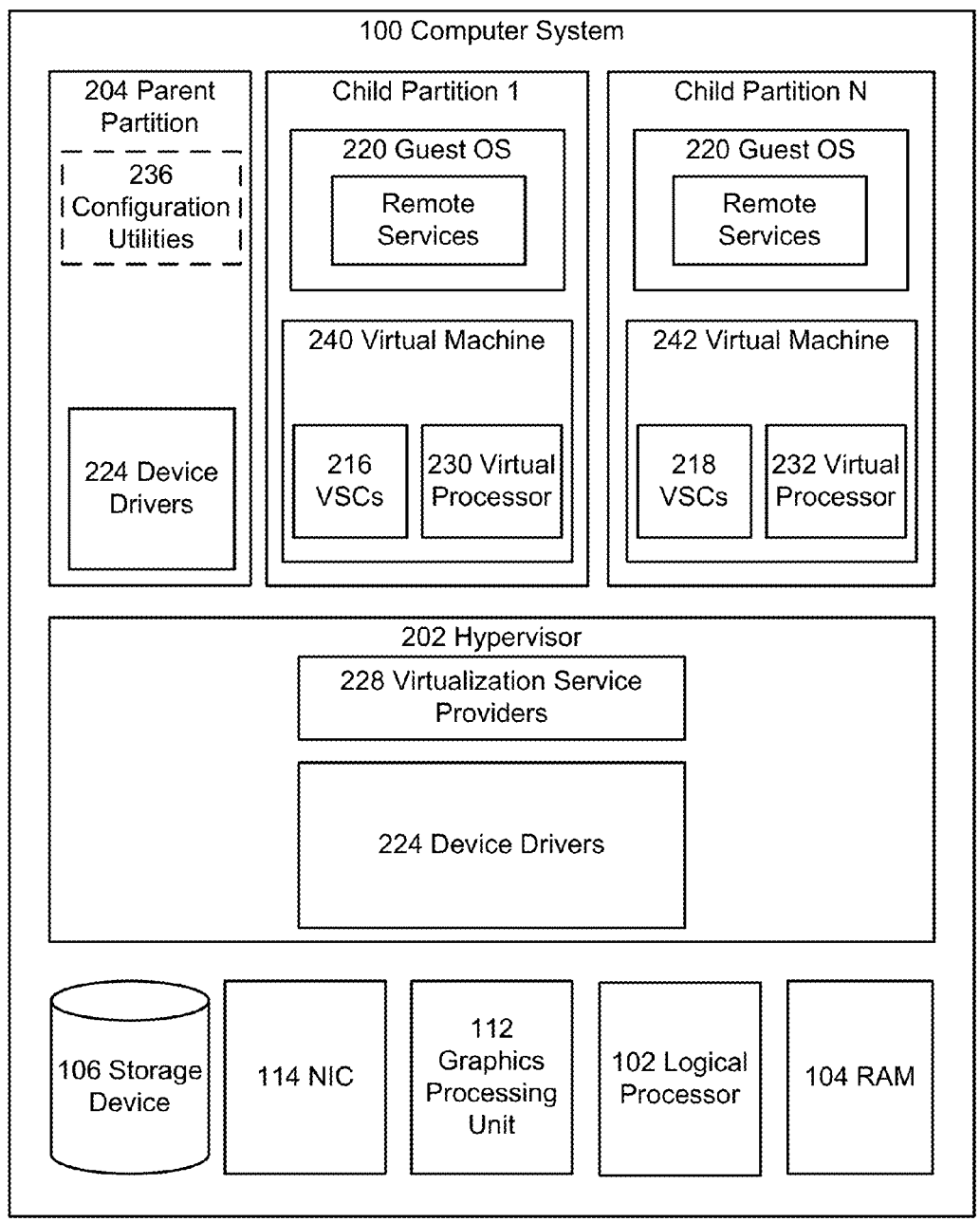
FIG. 2 depicts an example computing environment wherein aspects of the present disclosure can be implemented.

Referring now to FIG. 2, depicted is a high level block diagram of a computer system configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Figure 3:
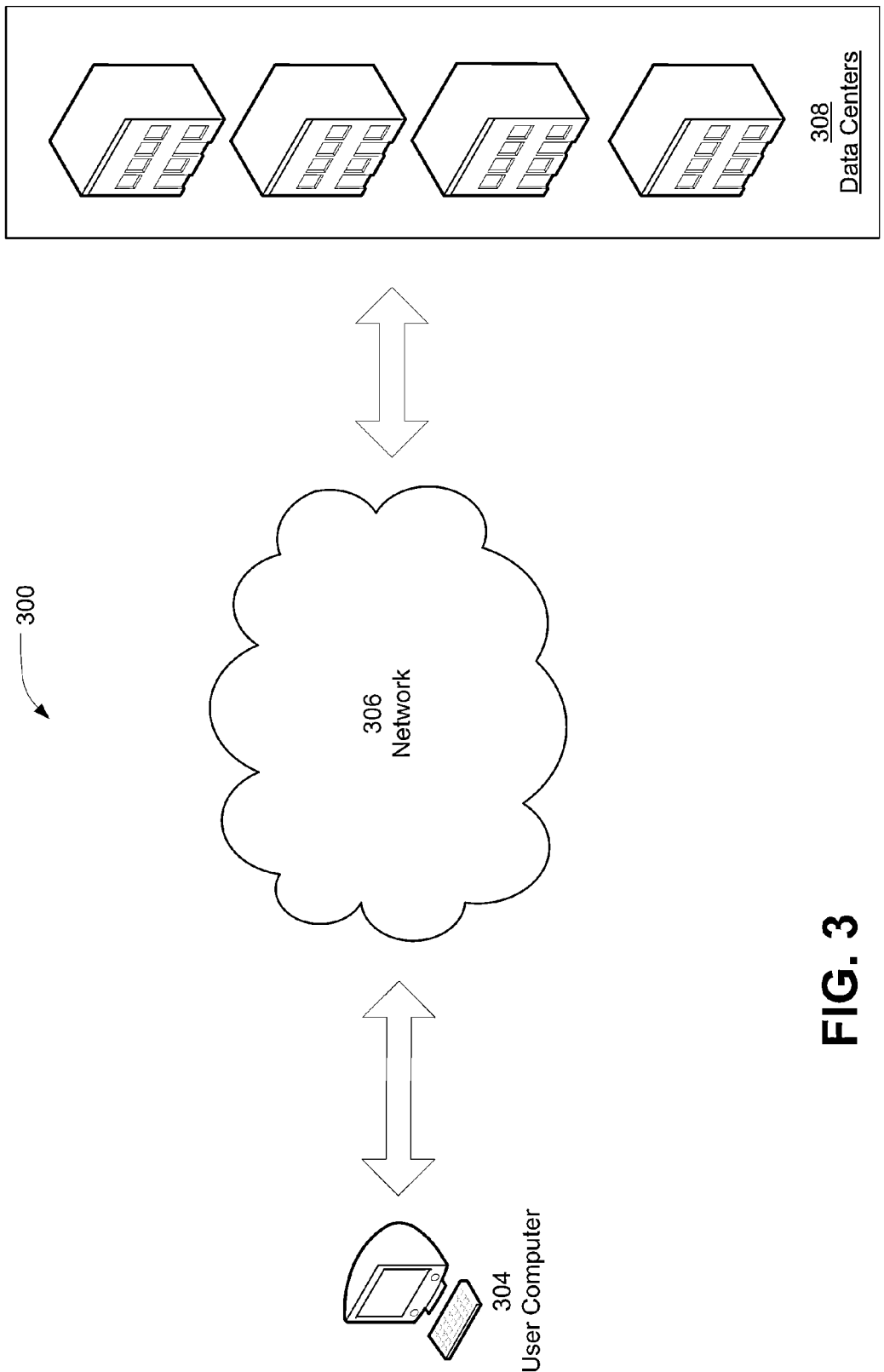
FIG. 3 depicts an example computing environment including data centers.

FIG. 3 and the following description are intended to provide a brief, general description of an example computing environment in which the embodiments described herein may be implemented. In particular, FIG. 3 depicts an illustrative operating environment 300 that includes data centers 308 for providing computing resources. Data centers 308 can provide computing resources for executing applications and providing data services on a continuous or an as-needed basis. The computing resources provided by the data centers 308 may include various types of resources, such as data processing resources, data storage resources, data communication resources, and the like. Each type of computing resource may be general-purpose or may be available in a number of specific configurations. For example, data processing resources may be available as virtual machine instances. The virtual machine instances may be configured to execute applications, including Web servers, application servers, media servers, database servers, and the like. Data storage resources may include file storage devices, block storage devices, and the like. The data center includes more than virtual machine computing resources, including a number of physical computing devices that can be configured to run one or more virtual machines that can be migrated across the physical resources to load balance.

The computing resources provided by the data centers 308 may be enabled by one or more individual data centers. The data centers 308 are facilities utilized to house and operate computer systems and associated components. The data centers 308 typically include redundant and backup power, communications, cooling, and security systems. The data centers 302 might also be located in geographically disparate locations. One illustrative configuration for a data center 308 that implements the concepts and technologies disclosed herein for scalably deploying a virtualized computing infrastructure will be described below with regard to FIG. 3.

The customers and other consumers of the data centers 308 may access the computing resources provided by the data centers 302 over a network 306. It should be appreciated that a local-area network ("LAN"), the Internet, or any other networking topology known in the art that connects the data centers 308 to remote consumers may be utilized. It should also be appreciated that combinations of such networks might also be utilized.

The user computer 304 may be a computer utilized by a customer or other consumer of the data centers 308. For instance, the user computer 304 may be a server computer, a desktop or laptop personal computer, a thin client, a tablet computer, a wireless telephone, a personal digital assistant ("PDA"), an e-reader, a game console, a set-top box, or any other computing device capable of accessing the data centers 308.

The user computer 304 may be utilized to configure aspects of the computing resources provided by the data centers 308. In this regard, the data centers 308 may provide a Web interface through which aspects of its operation may be configured through the use of a Web browser application program executing on the customer computing system 304. Alternatively, a stand-alone application program executing on the customer computing system 304 might access an application programming interface ("API") exposed by the data centers 308 for performing the configuration operations. Other mechanisms for configuring the operation of the data centers 308, including deploying updates to an application, might also be utilized.

Figure 4:
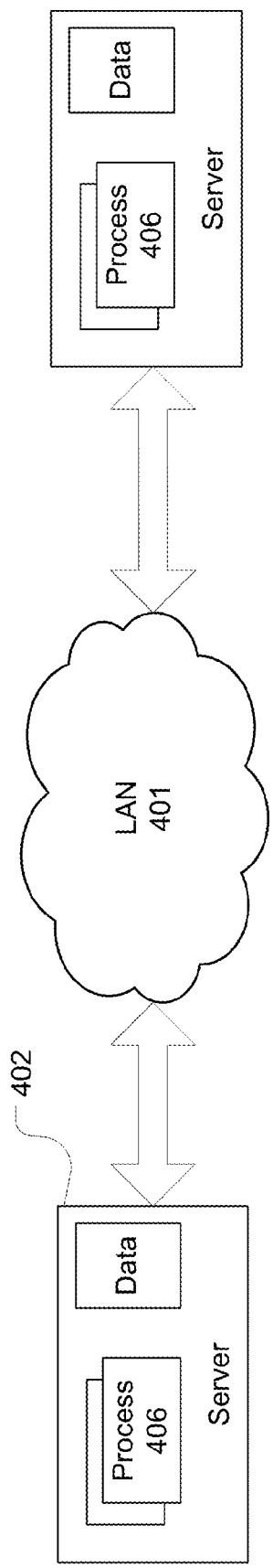
FIG. 4 depicts an operational environment of a data center.

FIG. 4 depicts a computing system diagram that illustrates one configuration for a data center 308, including the concepts and technologies disclosed herein for scalably deploying a virtualized computing infrastructure. FIG. 2 includes server computers 402 for providing computing resources for executing an application. The server computers 402 may be standard server computers configured appropriately for providing the computing resources described above. For instance, in one implementation the server computers 402 are configured to provide the processes 406.

In one embodiment, the processes 406 may be virtual machine instances. A virtual machine instance may be an instance of a software implementation of a machine (i.e., a computer) that executes programs much like a physical machine executes programs. In the example of virtual machine instances, each of the servers 402 may be configured to execute an instance manager capable of executing the instances. The instance manager might be a hypervisor or another type of program configured to enable the execution of multiple processes 406 on a single server 402, for example.

It should be appreciated that although some of the embodiments disclosed herein are discussed in the context of virtual machine instances, other types of instances can be utilized with the concepts and technologies disclosed herein. For example, the technologies disclosed herein might be utilized with instances of storage resources, processing resources, data communications resources, and with other types of resources. The embodiments disclosed herein might also be utilized with computing systems that do not utilize virtual machine instances, i.e., that use a combination of physical machines and virtual machines.

In the example data center shown in FIG. 4, a LAN 401 is utilized to interconnect the server computers 402. The LAN 401 may also connected to the WAN 306 illustrated in FIG. 3. It should be appreciated that the network topology illustrated in FIGS. 3 and 4 has been greatly simplified and that many more networks and networking devices may be utilized to interconnect the various computing systems disclosed herein. Appropriate load balancing devices or software modules might also be utilized for balancing a load between data centers, between each of the server computers 402 in each data center, and between instances 406 purchased by each customer of the data centers. These network topologies and devices should be apparent to those skilled in the art.

Cloud computing generally refers to a computing environment for enabling on-demand network access to a shared pool of computing resources (e.g., applications, servers, and storage) such as those described above. Such a computing environment may be rapidly provisioned and released with minimal management effort or service provider interaction. Cloud computing services typically do not require end-user knowledge of the physical location and configuration of the system that delivers the services. The services may be consumption-based and delivered via the Internet. Many cloud computing services involve virtualized resources such as those described above and may take the form of web-based tools or applications that users can access and use through a web browser as if they were programs installed locally on their own computers.

Cloud computing services are typically built on some type of platform. For some applications, such as those running inside an organization's data center, this platform may include an operating system and a data storage service configured to store data. Applications running in the cloud may utilize a similar foundation.

Figure 5:
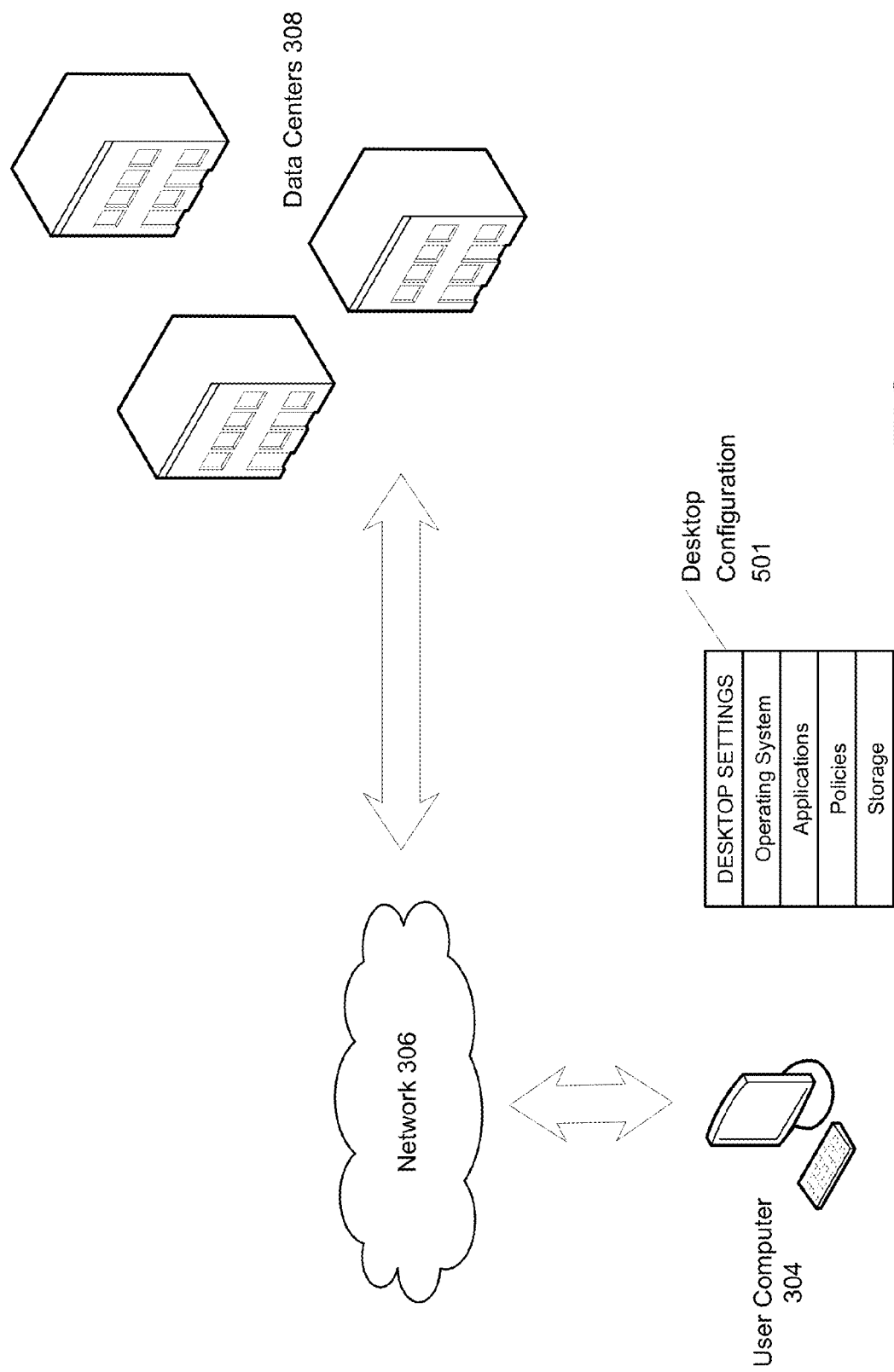
FIG. 5 depicts an operational environment for practicing aspects of the present disclosure.

FIG. 5 provides further detail to the example environment shown in FIG. 3. An administrator at user computer 304 can set up desktop configuration 501 including identifying an operating system, applications, policies and storage settings. Such preferences can be changed by the administrator and the provider of the services can charge a fee to the administrator for providing the requested configuration.

Figure 6:
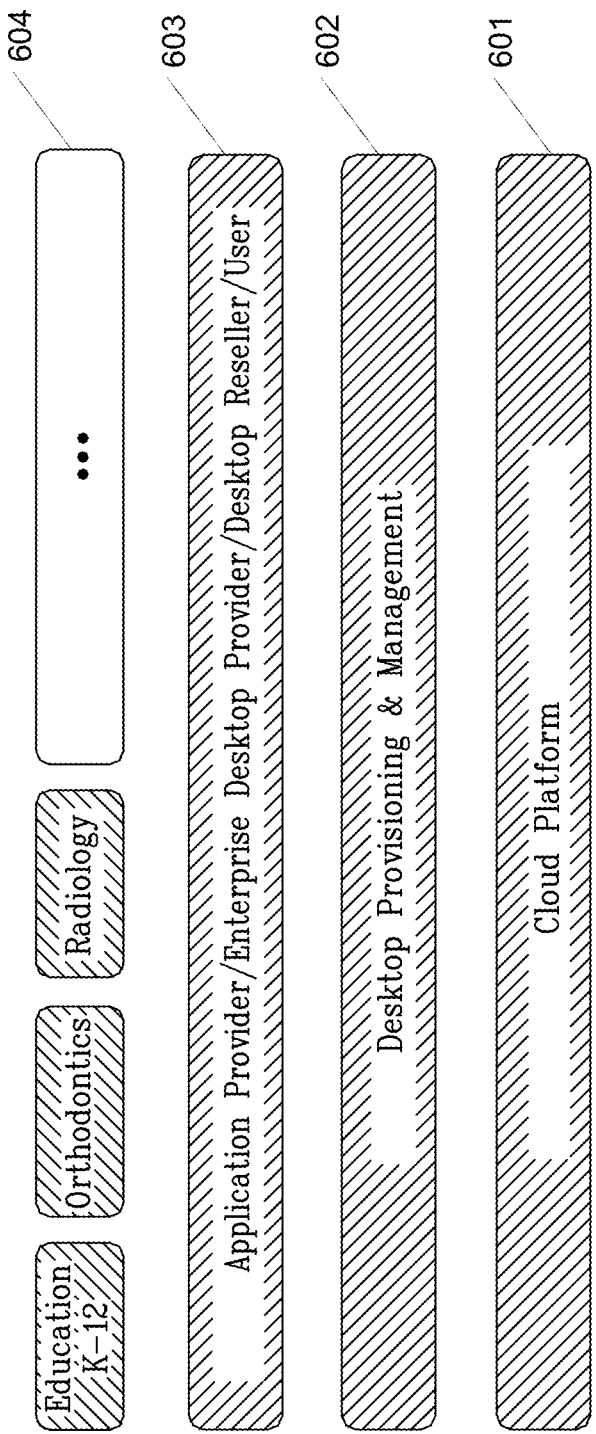
FIG. 6 illustrates an example architecture for practicing some of the methods disclosed herein.
Figure 7:
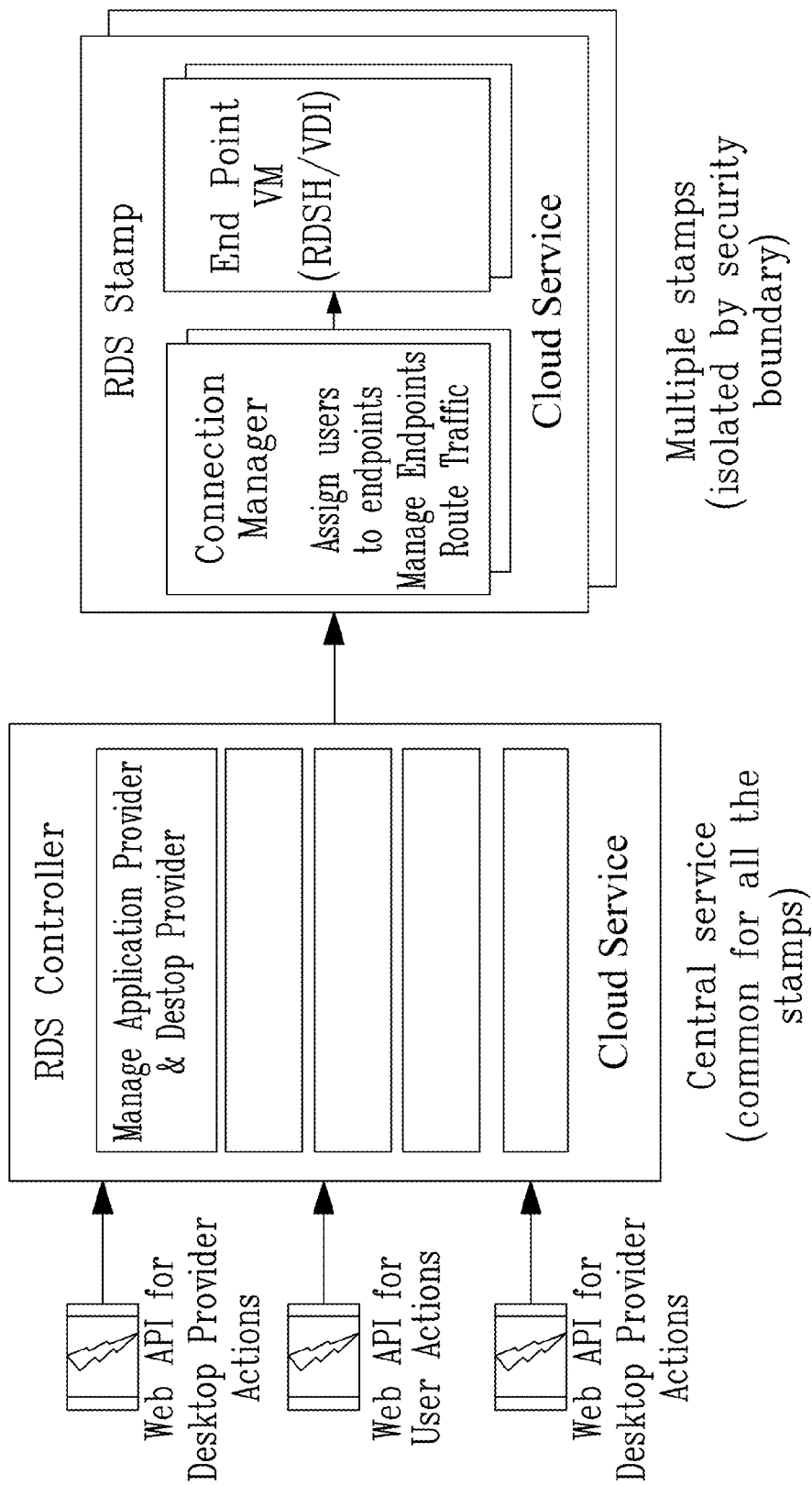
FIG. 7 illustrates an example block diagram depicting some of the methods disclosed herein.

In one embodiment and as further described in FIG. 6, a cloud service can implement an architecture comprising a stack of four layers as follows:

- a cloud computing platform 601 configured to provide the resources to support the cloud services
- a desktop provisioning and management layer 602 for creating and managing the cloud computing assets that enable application providers to provide applications, enterprise desktop providers and desktop resellers to create and manage desktops, users to connect to their desktops, etc. This layer can translate the logical view of applications and desktops to the physical assets of the cloud computing platform.
- an application provider/enterprise desktop provider/desktop reseller/user experiences layer 603 that provides distinct end-to-end experiences for each of the four types of entities described above.
- a vertical layer 604 that provides a set of customized experiences for particular groups of users and provided by desktop resellers.

In one embodiment of a cloud computing platform, a stamp may be implemented and used to define a unit of isolation and may be configured to define a traditional remote desktop deployment. A remote desktop controller component can be provided that maintains customer artifacts and credentials, manages loads across stamps, and provisions and resizes stamps. A remote desktop controller can also create and manage applications and desktops. Whereas a particular end point provides the virtual equivalent of a user's desktop, the stamp (or multiple stamps) provides the virtual equivalent of a company's computing infrastructure.

The layers described above may involve a number of components. Such components may include the following which are further described below.

- a compute component (e.g., FIG. 8) that runs applications in the cloud.
- a storage component (e.g., FIG. 9) that stores binary and structured data in the cloud
- a fabric controller component (e.g., FIG. 10) that deploys, manages, and monitors applications. The fabric controller may also handle updates to system software throughout the platform
- a content delivery network component (e.g., FIG. 11) that increases the speed for global access to data in the cloud storage by maintaining cached copies of that data around the world
- a connect component (e.g., FIG. 12) that allows creating IP-level connections between on-premises computers and cloud applications.

Figure 8:
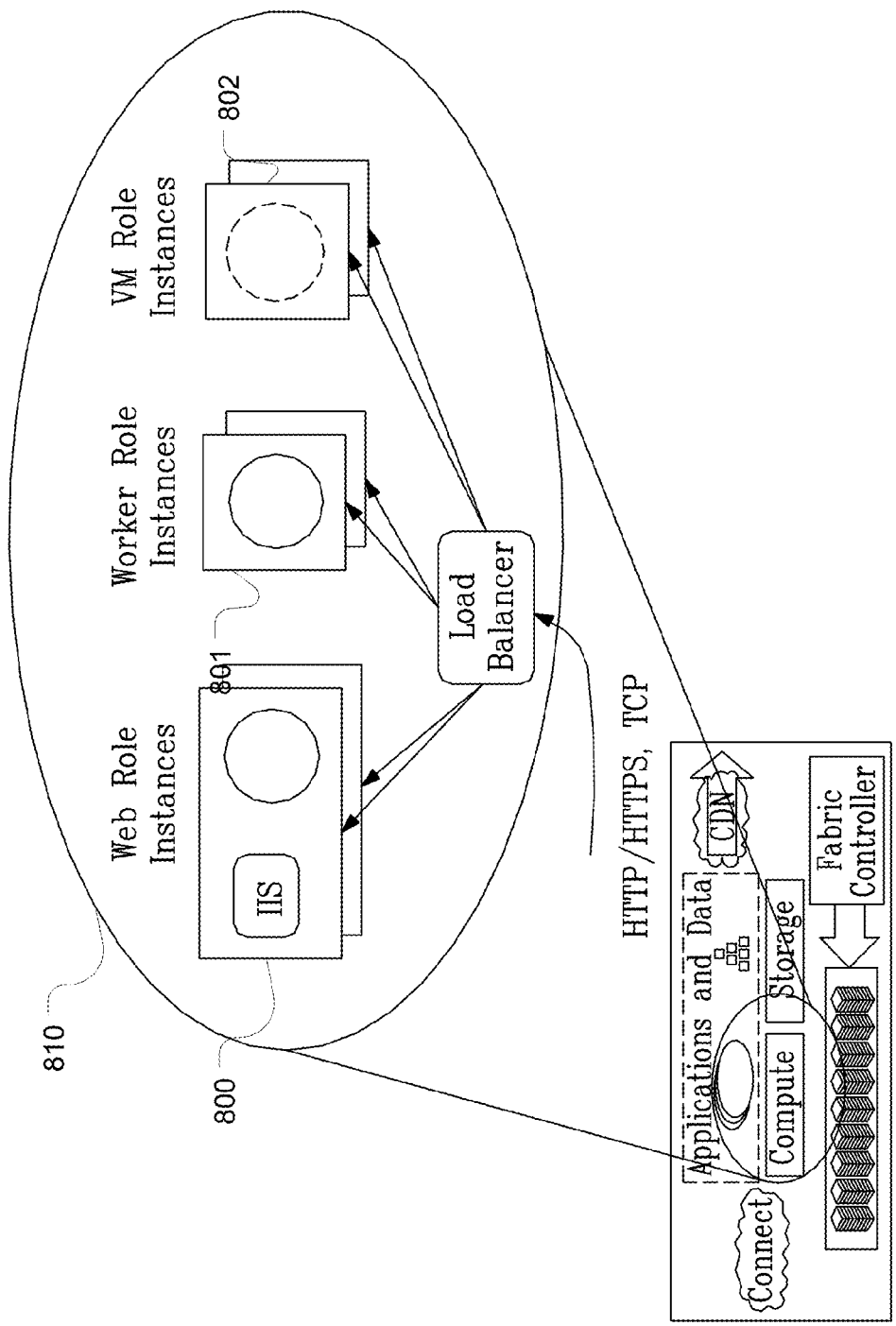
FIG. 8 illustrates an example block diagram depicting the compute component of a cloud data service.

Referring to FIG. 8 depicting a compute component 810, an application may be implemented as one or more roles 800 801 802 as described above. The cloud service may run multiple instances of each role, using load balancing to spread requests across the roles.

A portal may be provided to allow a developer to submit an application to the cloud service. The portal may be configured to receive configuration information that informs the cloud platform of how many instances of each role to run. The fabric controller component may create a virtual machine (VM) for each instance and run the code for the appropriate role in that VM. Requests from the application's users can be made using protocols such as HTTP, HTTPS, and TCP. The requests can be load balanced across all instances of a role.

Figure 9:
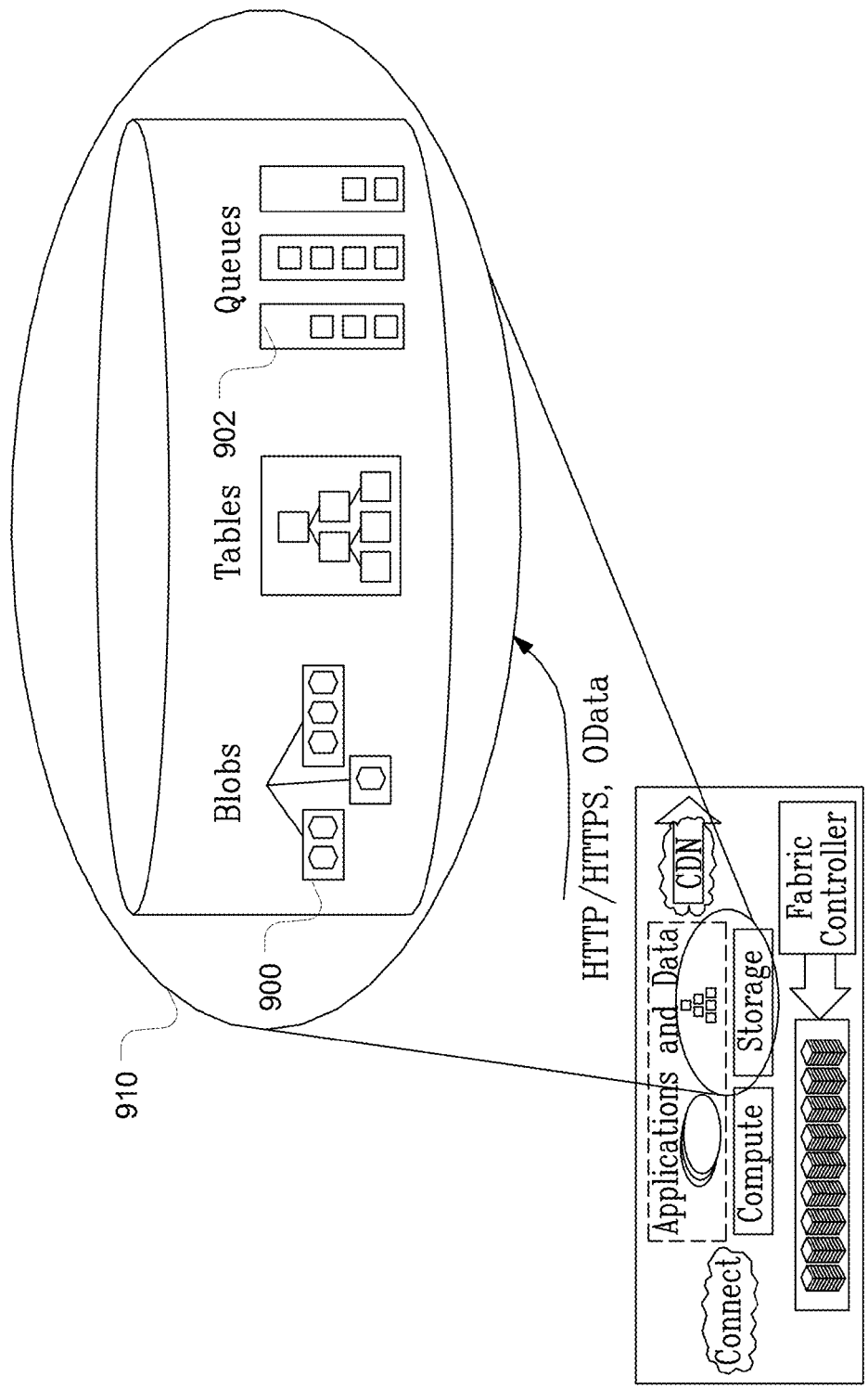
FIG. 9 illustrates an example block diagram depicting the storage component of a cloud data service.

Referring to FIG. 9 depicting a storage component 910, the cloud platform may provide data storage using a number of data structures and formats. For example, data storage can be provided as an unstructured blob of binary data 900. Metadata can be used to provide information as to content. In order to allow applications to work with data in a more structured fashion, cloud storage services may provide storage as groups of entities that are associated with properties. Applications may also be provided a means to query data such, as, for example, an API that includes search parameters. Additionally, cloud storage can provide a way for web role instances to communicate asynchronously with worker role instances. For example, a user might submit a request to perform some compute-intensive task via a web interface implemented by a web role. The web role instance that receives this request can write a message into a queue 902 describing the work to be done. A worker role instance that is waiting on this queue can then read the message and carry out the specified task. Results can be returned via another queue.

The cloud storage service may replicate data in order to provide fault tolerance. Furthermore, data can be backed up copy in another data center in a different physical location for redundancy and enhanced availability.

Figure 10:
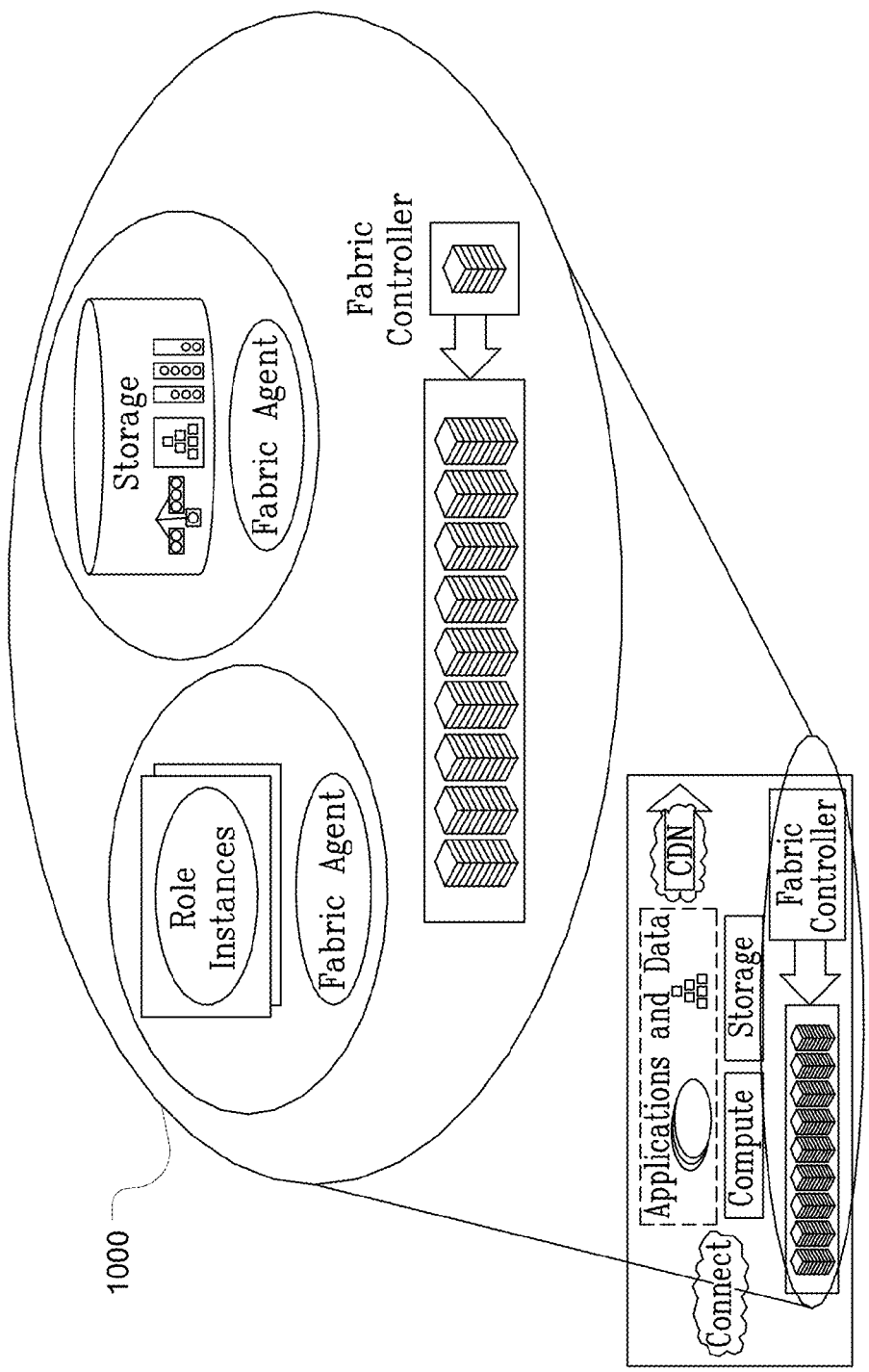
FIG. 10 illustrates an example block diagram depicting the fabric controller component of a cloud data service.

Referring to FIG. 10, a fabric controller component 1000 may be a distributed application replicated across a group of machines. The fabric controller component can be configured to own all of the resources in its environment such as computers, switches, and load balancers. The fabric controller component 1000 can also monitor running applications, determine where new applications should run, and select physical servers to optimize hardware utilization. The fabric controller component can also be configured to start, monitor, and terminate virtual machines.

Figure 11:
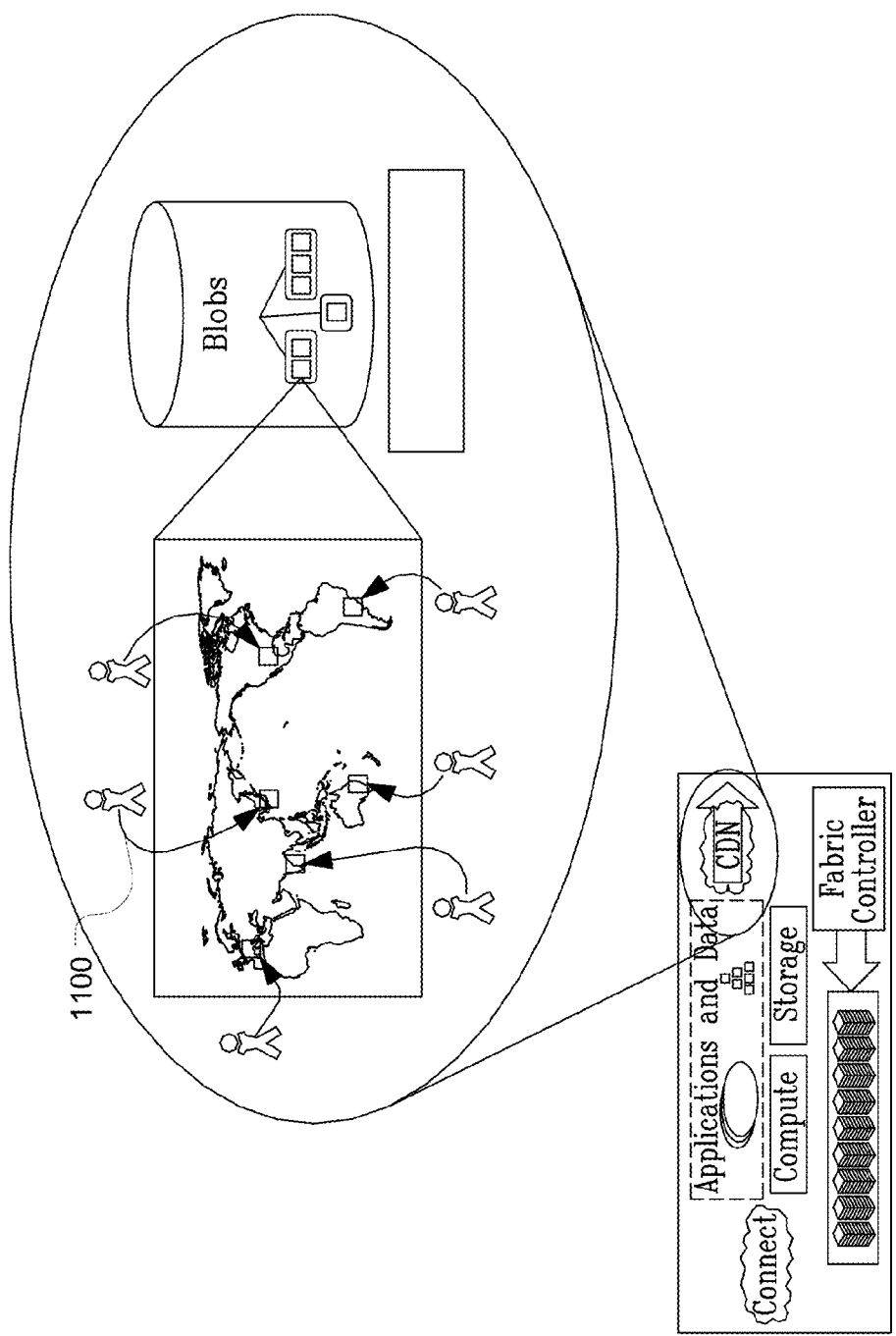
FIG. 11 illustrates an example block diagram depicting the CDN component of a cloud data service.
Figure 12:
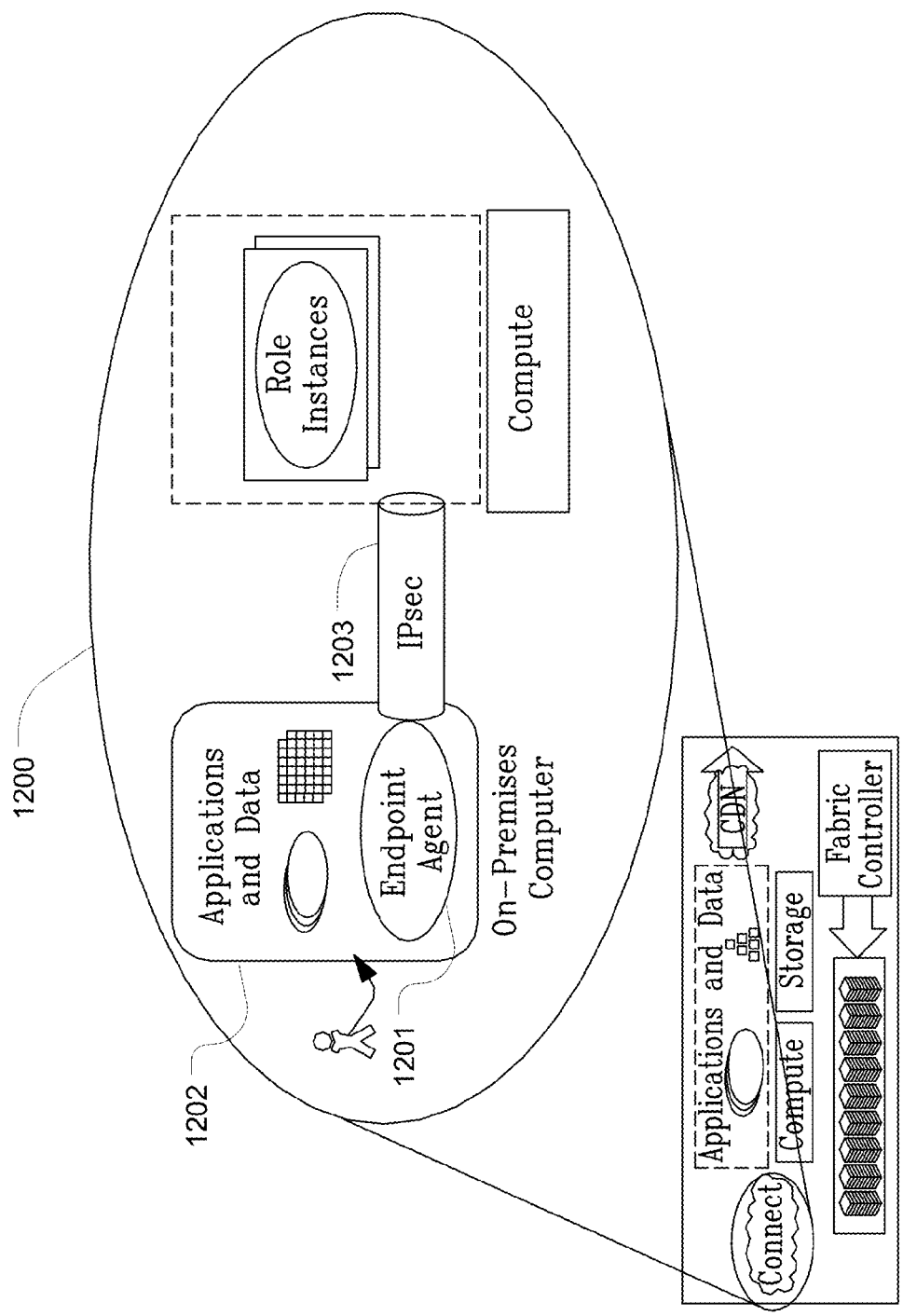
FIG. 12 illustrates an example block diagram depicting the connect component of a cloud data service.

In an embodiment and referring to FIG. 11, the cloud service can store copies of data at sites closer to the clients 1100 that use the data. For example, the first time a particular piece of data is accessed by a user, the content delivery network component can store a copy of that data (i.e., cache) at a location that is geographically close to that user. The next time the data is accessed, the contents can be delivered from the cache rather than from the more remote original.

In an embodiment and referring to FIG. 11, in order to support the applications and data used within an organization, on-premises environments may be connected with the cloud service. In an embodiment, this type of combination can be effectuated by providing IP-level connectivity between a cloud application and machines running outside of the cloud. An endpoint agent 1201 can be installed on each on-premises computer 1202 that connects to a cloud application. The cloud application may also be configured to work with the cloud connect component 1200. The agent can use protocols such as IPsec to interact with a particular role in that application. By using such an agent, the potential complexity of configuring protocols such as IPsec 1203 can be transparent to the user, while providing a much simpler connection than methods such as virtual private networks (VPNs). Once the connection is established, roles in a cloud application can appear to be on the same IP network as the on-premises machine.

By establishing such connections, a cloud application can access an on-premises database directly. A cloud application can also be domain-joined to the on-premises environment, allowing a single sign-on to the cloud application by on-premises users, and the use of existing active directory accounts and groups for access control.

In various embodiments, a remote desktop computing experience can be provided in which a desktop provider can provide an elastic pool of desktops from which an administrator can easily provision and manage numerous user desktops, much in the same manner as provisioning and managing a single user desktop. The remote desktop user can thus be provided with a desktop experience that is always available, free of administrative procedures, and billed based on consumption. For application providers, such a service can enable the application providers, with minimal effort, to provide traditional desktop applications to users in the form of web applications.

As businesses move to adopt remote or virtual desktops as a means to centralize the administration of secure and compliant employee desktops, it would be advantageous for IT administrators to be able to provide a homogenous desktop environment in order to control and minimize costs. Thus a platform that can provide a plurality of remote or virtual desktops can provide scalable and homogenous computing environments at low cost. By architecting a hosted desktop solution on a cloud platform in a manner similar to that of a homogenous computing model, IT administrators can be provided an environment that can significantly lower cost as compared to traditional "Desktop as a Service" alternatives.

A cloud computing platform can be configured to operate with and provide benefits to multiple users and providers. For example, for an application provider that provides applications to an enterprise desktop provider or a desktop reseller, a cloud computing platform may be configured to provision and sell traditional desktop applications in a scalable cloud model. The application provider may be enabled to create an application provider account with payout account information, upload application packages, test uploaded applications on a selected operation system, publish the application on an application marketplace on the cloud, monitor application usage and set user charges per user.

Figure 13:
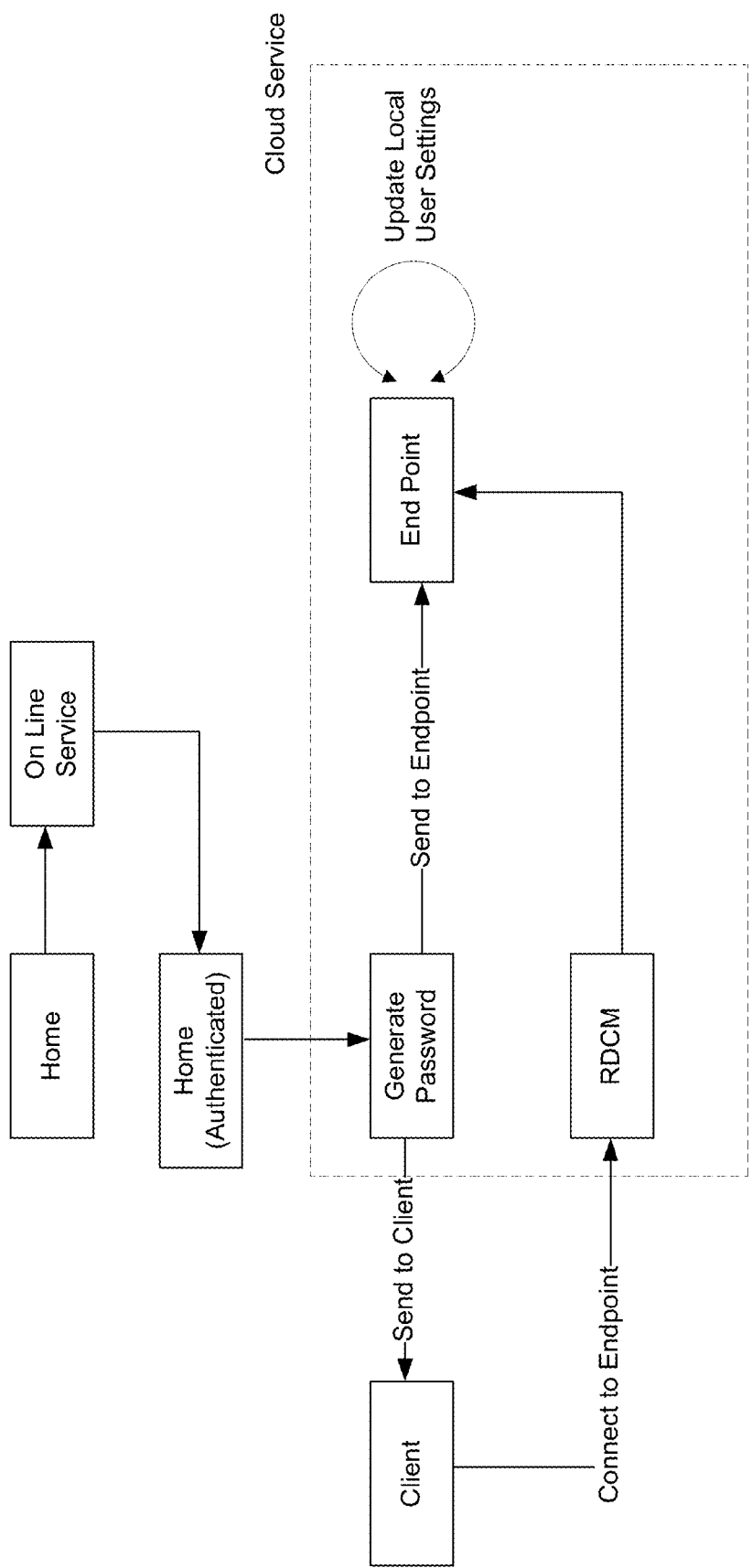
FIG. 13 illustrates an example embodiment of the methods disclosed herein.

Referring to FIG. 13, illustrated is an example block diagram depicting a process for providing remote desktop services in a cloud computing framework. A user may access via a browser a web page that provides an entry point to the remote desktop services accessible to the user and configured in accordance with the user's IT departments requirements. The user may log onto the system using credentials provided to the user. The credentials may be a persistent ID such as a Windows Live ID or OpenID. A user will then be redirected to an authentication server which may require entry of a username and password over a secured connection. Once authenticated, the user may be issued a password that is persisted for that user, the password being provided to other services so that additional authorization is not required. In an embodiment, the password may be persisted for that user even if the desktop session ends, unless the user explicitly logs off from the session.

A mechanism may be provided for automatically logging into a cloud based system in which a single user authentication and authorization process permits a user to access the resources in the cloud based system where the user has access permission, without the need to enter multiple passwords. Providing single sign-on allows users to log in once and access multiple applications without the need to enter more passwords. Single sign on is desirable for enterprises by increasing security and efficiency by reducing the number of passwords that must be maintained. For cloud service providers, single sign on provide a better user experience by allowing users greater access without additional authentication effort.

A cloud based service may not accept token log-on credentials generated by a single sign-on service. For example, a web-ID provider or single sign on service may prompt a user for sign on credentials, and the service may generate a ticket or tokens that can be used for connecting to other services. Examples of such systems may include Windows, Linux, and iOS. It is desirable to give users in an on-premises enterprise domain, for example, single sign-on access to applications running in the cloud service.

In an embodiment, when a user logs into a cloud based desktop and provides authentication credentials, a one-time password may be automatically generated and persisted. The generated one-time password may be used to log in automatically to additional processes in the cloud based system. In one embodiment, the generated one-time password can be persisted until the user explicitly logs off. Thus, even when the desktop session is unexpectedly terminated, the password can be persisted.

In another embodiment, a user may have an account with a service that provides integrated on line services such as Windows Live or Yahoo. Such a service may provide a set of services and software products such as email and multimedia services that are accessible using a single user ID and password. In an embodiment a user of such an integrated service may also be provided an option to access cloud based computing services as described above. Thus when a user has opted for cloud based computing services as part of such an integrated service, once the user has logged on to the service the user may be presented an option to accessed the cloud based computing service and request a remote desktop session. Because the cloud based service, e.g., the remote desktop, may not accept the credentials from the integrated service, the cloud based service may generate an account with a one time password that allows the user to access the desktop session. The details of the one time password need not be provided to the user since the password only exists for the duration of the session or until the user logs off. In an embodiment the one time password may be persisted so that the user may return to the desktop if the desktop is inadvertently disconnected without having to restart the logon process.

Figure 14:
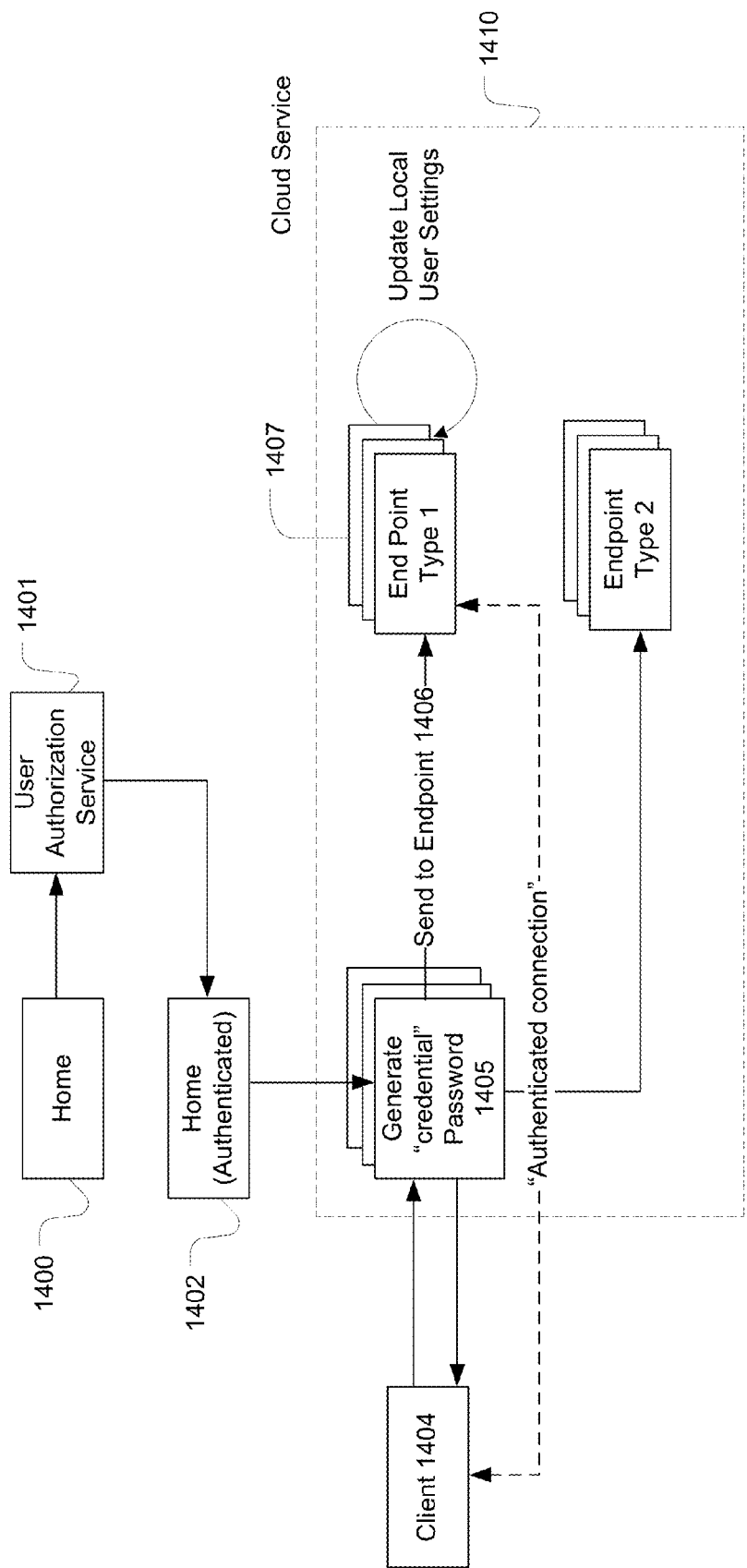
FIG. 14 illustrates an example embodiment of the methods disclosed herein.

In an embodiment illustrated in FIG. 14, client 1404 may enter a URL for his company's cloud based service home page 1400. Alternatively, the user may enter a URL for an integrated online service. The user may be directed to an online authentication service 1401 which prompts the user for authentication credentials. The online authentication service 1401 may be a service used by the administrator for the user and the user's credential information may be provided by the administrator to the cloud service, authorizing the service to create a user profile and allowing the user to launch and access desktops. Alternatively, the online authentication service 1401 may be provided by the integrated online service. Once the user is authenticated, the user is directed to a homepage 1402, the user can access the cloud service 1410 with the credentials provided by the online authentication service. The cloud service 1410 generates a one time password 1405 and/or a temporary user account, and the user's one time password is sent 140 to an endpoint 1407. As described above, the endpoint 1407 can be a user desktop session.

The one-time password may be generated based on the credentials received by the online authentication service. In an embodiment, the password can be stored in a local credentials store in the virtual machine hosting the user session. Thus the password is not persisted with the user in the user's profile, thus allowing for enhanced security and avoiding the need for the cloud service to maintain permanent passwords for each user.

The user can be presented with a number of desktops, e.g., an engineering desktop, a finance desktop, etc. that can be selected and logged into. For example, each desktop can be tailored to a specific functionality. The user may be presented with the specific desktops based on predefined authorization. Once the users select a desktop, a new desktop instance may be instantiated for that user. If a previous desktop instance is selected the session associated with the previous desktop instance may be resumed. The session for this user and session for other users can be launched as endpoints within a virtual machine that hosts a number of such sessions. A saved profile may be associated with each endpoint that is created or resumed that includes the user's preference and state information from a previous session and other information needed to maintain the user's state so the user's session can be persisted, paused, and resumed. Generally a desktop may consist of an operating system, applications, and settings. A desktop instance generally refers to a desktop plus a specific user profile. In some cases a desktop instance and a desktop session may be used interchangeably.

In an embodiment, multiple sessions can be launched for additional users. Referring to the example embodiment illustrated in FIG. 14, multiple sessions corresponding to multiple endpoints may be instantiated as additional users log into the system. Furthermore, the users may comprise multiple user types as defined by the administrator for the group of users. For example, as shown in the figure, multiples users of both Type 1 and Type 2 may log into the system and begin sessions. For example, Type 1 may be a finance type desktop and Type 2 may be an engineering type desktop. Of course, other examples are also possible. A virtual machine may be configured to host a number of sessions of one or more types. In one embodiment, the numbers of sessions may be independent of the underlying virtual machine configuration that is hosting the various user sessions. As additional user sessions are instantiated on the virtual machine, additional virtual machines may be launched. In one embodiment, a set number of remote desktop sessions can be configured to execute on a virtual machine. As more remote desktop sessions are needed, another virtual machine can be launched. An elastic pool of virtual machines may be provided so that sessions can be dynamically added at any time without the need for an end user or administrator to understand the underlying details for the structures providing the services.

Since the user may be assigned a virtual machine (VM) endpoint from a pool of available VM endpoints, the next time that a user logs in, the user may be connected to any one of the VM endpoints in the pool. In order to create a custom desktop experience for the user, the user's preferences and state data may be saved. In one embodiment, the user's preference and state data may be saved to a set of data that may be associated with the user so that any time that the user logs on and is assigned a desktop, the user preference and state data may be obtained so that the user's previous desktop state can be resumed. So for example, if the users is associated with a session (i.e. end point) on a first virtual machine and later is assigned to a different session on a different virtual machine, the user's desktop state from the first virtual machine would generally not be available to the session on the second virtual machine. However, according to an aspect of the disclosure, the user's state is saved independently of the session and the particular VM endpoint. As described in the present disclosure, such a set of user data may be referred to as a virtual profile. In various embodiments the virtual profile may be implemented and referred to as a virtual hard drive or virtual hard disk (VHD). As such, when the user is connected with a session on a different virtual machine, the previous user's state can be migrated to the new session. This feature allows a single master desktop that is designed to serve a particular Type to have a custom feel for each particular user. The result is that a user of an otherwise generic session environment is perceived by the user as having a personal desktop look and feel.

As discussed above, during the course of a user session, a client may open and close remote access connections to the cloud service, and during any given connection, the client may change settings and preferences in the session. A mechanism is described herein for provisioning remote desktops in a cloud based infrastructure while maintaining user personalization. In cloud based systems, a user may not always reconnect to the same virtual desktop. In one embodiment, the virtual profile assigned to a user may be mounted to the endpoint assigned to the user. The virtual profile may include information such as the user's personal data and personalization information (e.g., settings, profiles, files, application data, etc.).

When the user disconnects or logs off from the remote desktop, the virtual profile is demounted from the endpoint and saved for subsequent user sessions. The virtual profile thus saves information regarding the user's state when the user is disconnected and provides the information as needed for launching the next user session.

Since a user may be assigned a VM endpoint from a pool of available VM endpoints, the next time that a user logs in, the user may be connected to any one of the VM endpoints in the pool. In order to create a custom desktop experience for the user, the user's saved preference and state data may be used to provide the customized desktop experience regardless of the particular VM endpoint to which the user is connected.

While the terms virtual profile and VHD are used to describe a data structure for saving a user's preference and state information, it should be understood that the present disclosure is not intended to be limited to any particular file or data format. In one embodiment a virtual profile or a VHD may be a virtual hard disk file format that is configured as data that is typically found on a physical data disk drive.

Initially, a virtual profile or a VHD may be populated with data operable to configure a user's desktop in accordance with the standard desktop configuration as defined by, for example, a company IT administrator. Thus a virtual profile or a VHD may include data defining the "gold image" of the desktop (i.e., the standard desktop configuration for a user role). Nevertheless, as a user uses a particular remote desktop and begins to customize the desktop by for example, changing the wallpaper, adding music, saving local documents, etc., that information is stored to the virtual profile or a VHD and an each time thereafter that a user is connected to a standard remote desktop, it is populated with the data from the virtual profile or a VHD to provide the look and feel of a custom user experience.

Any combination of user types (i.e., desktop types) may be defined within the boundaries of a single cloud service boundary. For example cloud service boundary 1410 may define a single service boundary as defined and configured for a set of services provided to a particular company and accessible using a predetermined URL which, when entered via a browser, may provide a web interface for logging on to the service and accessing the desktops configured for service.

In an embodiment, when a user session is requested, a connection to a connection broker may initially be requested. The connection broker may determine the stamp associated with the requested user session and select a virtual machine that is hosting user sessions within the identified stamp. For example, if the request indicates that a user session is desired, the connection broker may search a database that includes IP address port number combinations or network identifiers to find a suitable virtual machine being hosted on a cloud server. The connection broker can generate a redirection request that causes the user session to be associated with the identified virtual machine.

Figure 17:
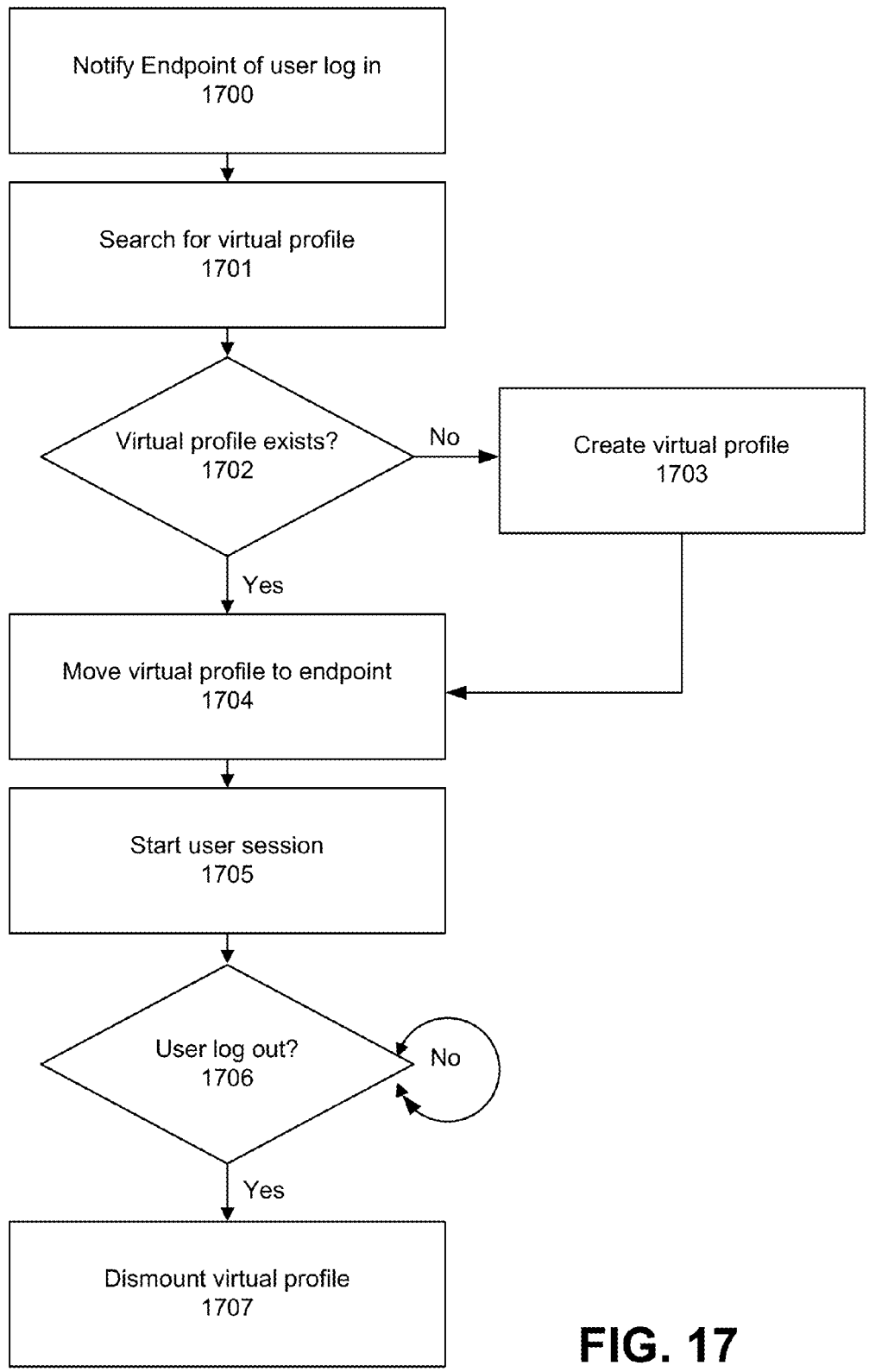
FIG. 17 illustrates an example embodiment of a user data mounting scenario.

Referring to the embodiment described in FIG. 17, an endpoint may be notified 1700 that a user has logged into the system. The system searches for a virtual profile 1701 and determines whether a virtual profile already exists for the user 1702. If there is no virtual profile for the user, then a virtual profile is created 1703. If a virtual profile already exists for the user or if a virtual profile was created, then the user virtual profile is moved to the endpoint 1704. The user desktop session may be launched 1705. When it is determined that the user has logged out 1706, then the virtual profile is dismounted 1707 from the endpoint and saved for subsequent use.

Access to Multi Tenant Applications

A mechanism is now described for presenting a software application to a plurality of users in a cloud computing environment. For example, an application that was designed for use by a single user is provided in a cloud based platform without re-architecting the application. Using a web-based interface, multiple cloud users may launch and execute the application. The various instances of the application are presented to the cloud users as if the application were designed as a multi-user application.

In an embodiment, an application architected for a single user may be provided on a cloud based platform. An application provider may access a web site or other use interface to upload a single user application and request that the single user application be accessible to multiple users via the cloud based platform. Although the application was not designed for multiple user access, the present disclosure provides a mechanism by which such an application may be made accessible to an unlimited number of users without the need for the application provider to re-architect the application.

In a cloud computing environment, executing an application architected for a single user may result in a circumstance in which processing power/hardware is readily available but in which the software architecture is such that the application is not amenable for presentation to multiple users or multiple user sessions. For example, in the case of a single user, the single use application may be allocated resources according to the needs of the application and the application may be executed on a single set of resources.

In an embodiment, one or more portions of the single use application may be parsed and multiple instances of the one or more portions of the software may be instantiated in one or more endpoints running in one or more virtual machines. Each of the one or more portions of software may then be associated with one or more user sessions and rendered for presentation to each of the user sessions. Each of the one or more user sessions may be in communication with the corresponding instance of the one or more portions of the software and may send and receive data indicative of instructions associated with the application's processes. Thus, the one or more portions of software associated with the one or more user sessions may send and receive data to and from a user via the user session. A request received by an instance of the one or more portions of software may be executed on the one or more virtual machines.

In another embodiment, a single instance of an application architected for a single user may execute in a virtual machine. A multi-tenant application manager may be in communication with a plurality of user sessions, and for each user session, the multi-tenant application manager may maintain a state of the user session's interaction with the application. The application may receive and process requests from the user sessions. A snapshot of the user display may be rendered for each user session.

In one embodiment, the multi-tenant application manager may add and/or remove resources from a pool of available resources for the application. Further, the multi-tenant application manager may queue requests each user session. In another embodiment, multiple instances of the application may be instantiated, each instance being associated with a user session. Each instance of the application may then maintain their own states for their respective user sessions.

In an embodiment, an application provider may access the cloud data service and using a web or other user interface can upload a single user application that the provider wishes to make available to multiple users. The provider may selection options such as a URL (e.g., www.mysingleapp.com) and a fee structure that users should pay in order to use the single use application. Typically such a single use application would be a complex application that was originally designed for single users and which would be expensive to rearchitect to offer as a multiple user application on a per-use basis. Often a user may be willing to pay a fixed fee for a single use of such an application rather than the high cost of purchasing a complex application that may be used infrequently. The application provider may upload the software to the cloud and select a fee based on usage, or daily, monthly or weekly access, for example. Users may pay by credit card, be billed, etc.

Figure 18:
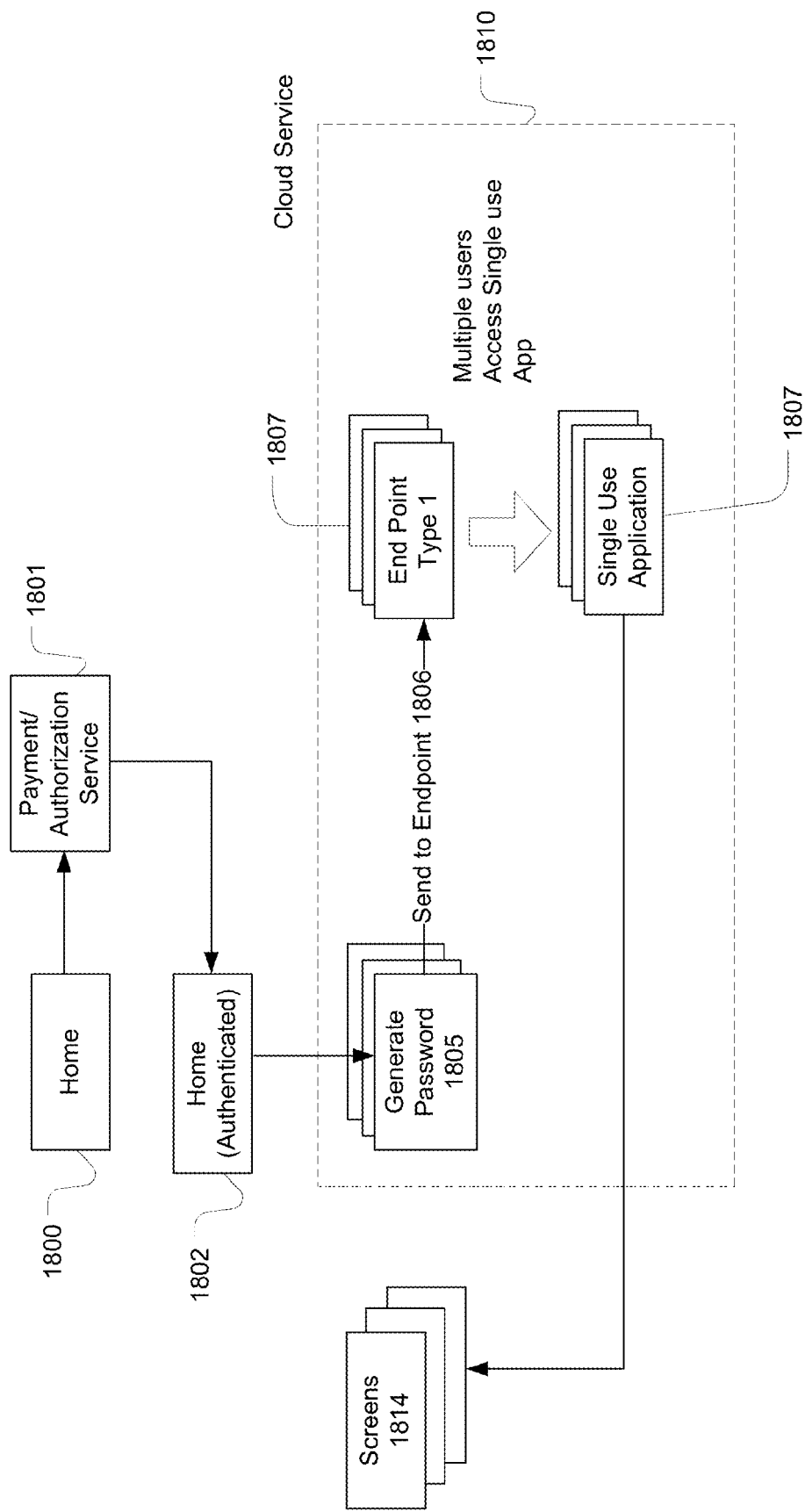
FIG. 18 illustrates an example embodiment of the methods disclosed herein.

The cloud service provider may host a web site that is accessible by the URL selected by the application provider. The user may be provided a web page that provides information about the single use application. The user may be provided options for selecting a fee payment option. Referring to FIG. 18, the user may be directed to an payment and authentication service 1401 which prompts the user for payment information. Once the user is authenticated, the user is directed to a welcome home page 1402. The cloud service 1410 generates a one time password 1405 and/or a temporary user account, and the user's one time password is sent 140 to an endpoint 1407. As described above, the endpoint 1407 can be a user desktop session. The user desktop session then begins an instance of the single use application 1807 and in accordance with one of the embodiments described above. The user is presented, via the user's screen, a graphic representation of the single use application which appears to the user to be an instance of the single use application In another embodiment, from the perspective of the user session, after logging on to the cloud computing system via a web page, the user may be presented a desktop that may further include an option to select the single use application. The user may select the single use application and be presented, via the user's web browser, an interface that represents the look and feel of the actual user interface for the single use application as if the single use application were executing locally on a local set of computing resources. Multiple users may access the single use application in parallel user sessions, each session appearing to independently access and execute the single use application.

As described above, user preference and state data may be saved to a data structure that may be associated with the user so that any time that the user logs on and is assigned a desktop, the user preference and state data may be obtained and the user's previous desktop state can be resumed. According to an aspect of the invention, the user's state with regard to the single use application is saved independent of the particular session and the particular virtual machine host. Such a set of user data may be referred to as a VHD as discussed above. Thus, when the user revisits the website in order to access the single use application or re-launches the single use application via a remote desktop session, the previous user data and saved data files and any preferences with respect to the single use application can be migrated to the new session.

Figure 15:
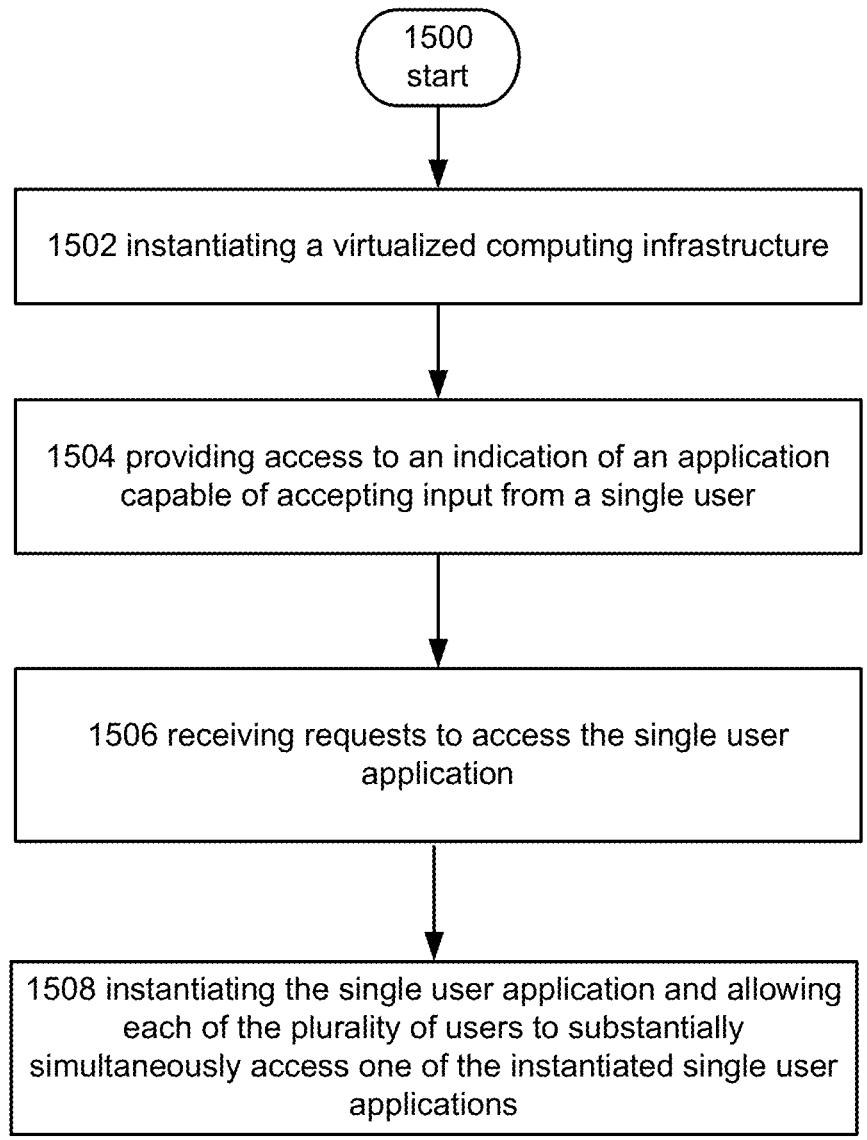
FIG. 15 illustrates an example of an operational procedure for practicing aspects of the present disclosure.

FIG. 15 depicts an exemplary operational procedure for deploying a software application to multiple users in a virtualized computing environment including operations 1500, 1502, 1504, 1506, and 1508. Referring to FIG. 15, operation 1500 begins the operational procedure and operation 1502 illustrates instantiating a virtualized computing infrastructure that makes available, via a remote network connection, one or more user remote desktop operating environments to a plurality of users via a web-based user interface. The user remote desktop configuration may include saved state information for an operating environment and software applications executing in the operating environment. The remote desktop configurations can each correspond to a user role. For example, an administrator can use a user interface to define two desktop environments for a medium sized company. The administrator may define a first desktop environment for engineering staff and may select an operating system and version, an email and calendar application, a browser application, office applications, and a drawing application. The administrator may further specify that up to fifty such desktops may be used at one time. The administrator may also define a second desktop environment for finance staff and may select an operating system and version, an email and calendar application, a browser application, office applications, and a database application. The administrator may further specify that up to twenty-five such desktops may be used at one time. The remote desktop configurations can be accessible via the Internet using a URL. For example, after configuring the desktop environments, the desktop environments may be accessible by the individual users by entering, for example, www.company.com/tech and www.company.com/finance.

Operation 1504 illustrates providing access, via the one or more user remote desktop operating environments, an indication of an application capable of accepting input from a single user.

Operation 1506 illustrates receiving, via the one or more user remote desktop operating environments, requests to access the single user application.

Operation 1508 illustrates for each request, instantiating the single user application on each of the one or more user remote desktop operating environments and allowing each of the plurality of users to substantially simultaneously access one of the instantiated single user applications.

Operation 1510 illustrates maintaining state data for the instantiated single user applications so that the instantiated single user applications can be resumed in a subsequent session.

Figure 16:
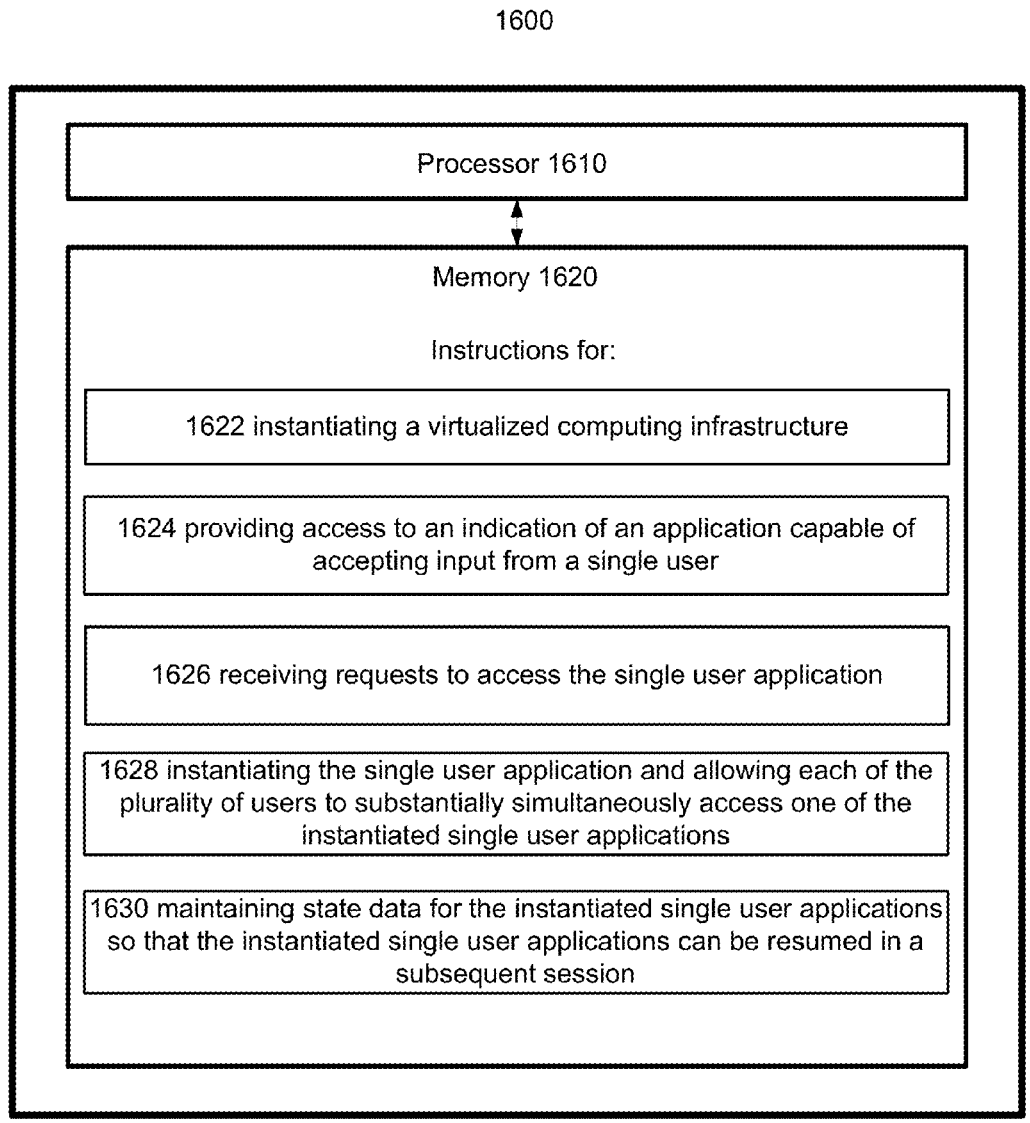
FIG. 16 illustrates an example system for practicing aspects of the present disclosure.

FIG. 16 depicts an exemplary system for deploying a software application to multiple users in a virtualized computing environment as described above. Referring to FIG. 16, system 1600 comprises a processor 1610 and memory 1620. Memory 1620 further comprises computer instructions for deploying a software application to multiple users in a virtualized computing environment. Block 1622 illustrates instantiating a virtualized computing infrastructure that makes available, via a remote network connection, one or more user remote desktop operating environments to a plurality of users via a web-based user interface. Block 1624 illustrates providing access, via the one or more user remote desktop operating environments, an indication of an application capable of accepting input from a single user. Block 1626 illustrates receiving, via the one or more user remote desktop operating environments, requests to access the single user application. Block 1628 illustrates for each request, instantiating the single user application on each of the one or more user remote desktop operating environments and allowing each of the plurality of users to substantially simultaneously access one of the instantiated single user applications. Block 1630 illustrates maintaining state data for the instantiated single user applications so that the instantiated single user applications can be resumed in a subsequent session.

Any of the above mentioned aspects can be implemented in methods, systems, computer readable media, or any type of manufacture. For example, a computer readable medium can store thereon computer executable instructions for deploying a software application to multiple users in a virtualized computing environment. Such media can comprise a first subset of instructions for instantiating a virtualized computing infrastructure that makes available, via a remote network connection, one or more user remote desktop operating environments to a plurality of users via a web-based user interface; a second subset of instructions for providing access, via the one or more user remote desktop operating environments, an indication of an application capable of accepting input from a single user; a third set of instructions receiving, via the one or more user remote desktop operating environments, requests to access the single user application; a fourth set of instructions for each request, instantiating the single user application on each of the one or more user remote desktop operating environments and allowing each of the plurality of users to substantially simultaneously access one of the instantiated single user applications; and a fifth set of instructions for maintaining state data for the instantiated single user applications so that the instantiated single user applications can be resumed in a subsequent session. It will be appreciated by those skilled in the art that additional sets of instructions can be used to capture the various other aspects disclosed herein, and that the five presently disclosed subsets of instructions can vary in detail per the present disclosure.

What is claimed:

1. A method of deploying a software application to multiple users in a virtualized computing environment, the method comprising:
   instantiating a virtualized computing infrastructure that makes available, via a remote network connection, one or more user remote desktop operating environments to a plurality of users via a web-based user interface;
   providing, via the one or more user remote desktop operating environments, an indication of a single user application operable to accept input from a single user;
   receiving, via the one or more user remote desktop operating environments, multiple requests to access the single user application;
   responsive to the multiple requests, instantiating the single user application on multiple ones of the one or more user remote desktop operating environments and allowing a plurality of users to access the instantiated single user applications concurrently; and
   storing state data for the instantiated single user applications so that the instantiated single user applications can be continued in one or more subsequent sessions.

2. The method of claim 1, further comprising maintaining the state data for the instantiated single user applications.

3. The method of claim 1, further comprising presenting and maintaining state data for multiple instances of the single user application for multiple users.

4. The method of claim 1, wherein the instantiated single user applications are instantiated on virtual machines.

5. The method of claim 1, wherein said instantiating comprises instantiating portions of a single copy of the single user application.

6. The method of claim 2, wherein said maintaining is performed by a multi-tenant application manager configured to manage access to the instantiated single user applications.

7. The method of claim 1, wherein said instantiating is performed by a multi-tenant application manager configured to manage access to the instantiated single user applications.

8. A computing system comprising:
   a computing device comprising at least one processor;
   a memory communicatively coupled to said processor when said system is operational; said memory having stored therein computer instructions that upon execution by the at least one processor cause:
   instantiating a virtualized computing infrastructure that makes available, via a remote network connection, one or more user remote desktop operating environments to a plurality of users via a web-based user interface;
   providing, via the one or more user remote desktop operating environments, an indication of a single user application capable of accepting input from a single user;
   receiving, via one of the one or more user remote desktop operating environments, at least one request to access the single user application;
   in response to the at least one request, instantiating the single user application on one of the remote desktop operating environments while allowing multiple users to access the single user application concurrently; and
   storing state data for the instantiated single user applications so that the instantiated single user applications can be continued in one or more subsequent sessions.

9. The computing system of claim 8, wherein the one or more remote desktop operating environments comprise an operating system and software applications to be included in the remote desktop operating environments.

10. The computing system of claim 8, further comprising presenting and maintaining state data for multiple instances of the single user application for multiple users.

11. The computing system of claim 8, wherein the instantiated single user application is instantiated on a virtual machine.

12. The computing system of claim 8, wherein said instantiating comprises instantiating portions of a single copy of the single user application.

13. The computing system of claim 8, further comprising maintaining the state data for the instantiated single user application.

14. The computing system of claim 8, wherein said maintaining is performed by a multi-tenant application manager configured to manage access to the instantiated single user application.

15. A computer readable storage device storing thereon computer executable instructions for deploying a software application to multiple users in a virtualized computing environment, the computer executable instructions comprising:
   instructions for instantiating a virtualized computing infrastructure that makes available, via a remote network connection, one or more user remote desktop operating environments to a plurality of users via a web-based user interface;
   instructions for providing, via the one or more user remote desktop operating environments, an indication of a single user application operable to interact with a single user;
   instructions for receiving, via the one or more user remote desktop operating environments, a request to access the single user application;
   in response to the request, instantiating the single user application while allowing other users to access the single user application concurrently; and storing state data for the instantiated single user applications so that the instantiated single user applications can be continued in one or more subsequent sessions.

16. The computer readable device of claim 15, wherein the one or more remote desktop operating environments comprise an operating system and software applications to be included in the operating environment.

17. The computer readable device of claim 15, further comprising instructions for presenting and maintaining the state data for multiple instances of the single user application for multiple users.

18. The computer readable device of claim 17, wherein the instantiated single user applications are instantiated on virtual machines.

19. The computer readable device of claim 15, wherein said instantiating comprises instantiating portions of a single copy of the single user application.

20. The computer readable device of claim 15, further comprising instructions for maintaining state data for the instantiated single user application, wherein the state data allows the instantiated single user application to resume in at least one subsequent session.

* * * * *